United States Patent [19]

Maruyama et al.

[11] Patent Number: 5,524,228
[45] Date of Patent: Jun. 4, 1996

[54] MEMORY CONTROL CIRCUIT FOR REDUCING THE NUMBER OF ROW ADDRESS SIGNALS

[75] Inventors: Naotaka Maruyama; Katsuya Mitsutake, both of Kanagawa, Japan

[73] Assignee: Fuji Xerox Co., Ltd., Tokyo, Japan

[21] Appl. No.: 203,606

[22] Filed: Feb. 28, 1994

Related U.S. Application Data

[63] Continuation of Ser. No. 690,828, Apr. 26, 1991, abandoned.

[30] Foreign Application Priority Data

Apr. 26, 1990 [JP] Japan ................................. 2-111542

[51] Int. Cl.⁶ ................................................. G06F 12/00
[52] U.S. Cl. ........................... 395/421.1; 395/421.01
[58] Field of Search ................................ 395/425, 842, 395/421.1.484, 410; 365/185.05, 238.5; 364/200 MS File, 900 MS File

[56] References Cited

U.S. PATENT DOCUMENTS

| | | | |
|---|---|---|---|
| 4,839,856 | 6/1989 | Tanaka | 395/421.01 |
| 4,924,375 | 5/1990 | Fung et al. | 395/484 |
| 4,933,910 | 6/1990 | Olson et al. | 365/238.5 |
| 4,943,944 | 7/1990 | Sakui et al. | 365/189.05 |
| 5,007,020 | 4/1991 | Inskeep | 395/410 |
| 5,051,889 | 9/1991 | Fung et al. | 395/484 |
| 5,058,005 | 10/1991 | Culley | 395/842 |

*Primary Examiner*—Tod R. Swann
*Assistant Examiner*—B. James Peikari
*Attorney, Agent, or Firm*—Finnegan, Henderson, Farabow, Garrett & Dunner

[57] ABSTRACT

A method of accessing a dynamic random access memory, including the steps of latching an upper address of the most recent address signal supplied from a requesting element, sending out the upper address of the most recent address signal and an active row address strobe signal to the dynamic random access memory, and sending out a lower address of the most recent address signal and an active column address strobe signal to the dynamic random access memory. In this method, the latched upper address is compared with an upper address of a subsequent address signal supplied from the requesting element at the time of the next access request. If the two upper addresses coincide, a lower address of the subsequent address signal and an active column address strobe signal are sent to the dynamic random access memory.

2 Claims, 6 Drawing Sheets

TRANSITION CONDITION/OPERATION
Output signal=[LE, SEL, RAS, CAS, ACK]

MEMORY CONTROL CIRCUIT FOR REDUCING THE NUMBER OF ROW ADDRESS SIGNALS

This application is a continuation of application Ser. No. 07/690,828, filed Apr. 26, 1991, now abandoned.

BACKGROUND OF THE INVENTION

This invention relates to a method for accessing a dynamic random-access memory.

Figure 7:
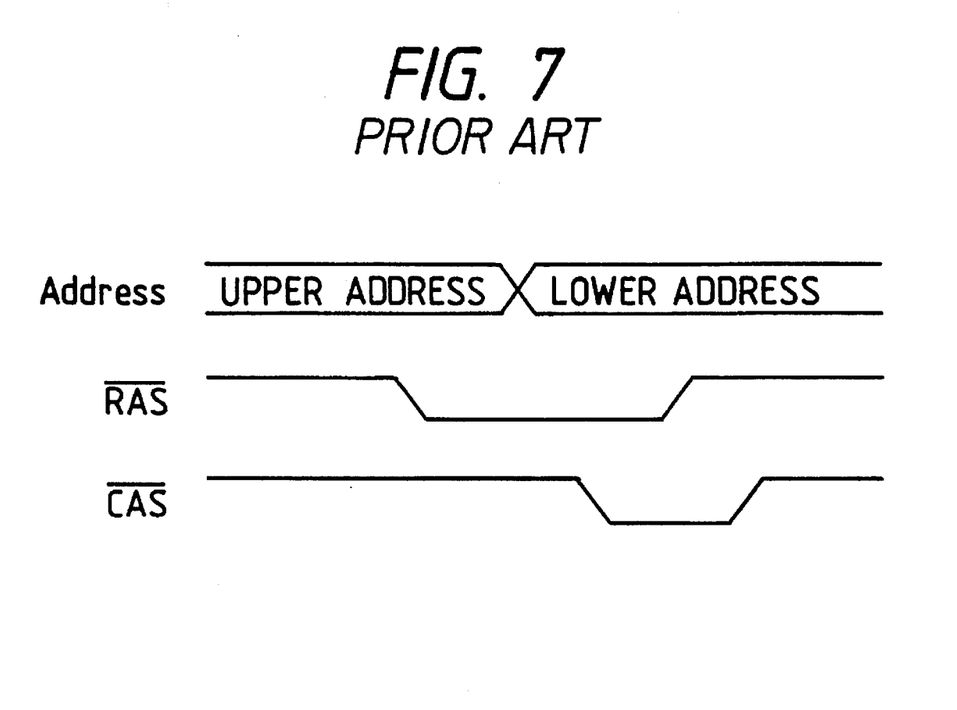
FIG. 7 is a timing chart showing the typical operation of accessing a dynamic RAM.

A conventional method for accessing dynamic random-access memories (hereinafter sometimes abbreviated as "DRAM") is shown in FIG. 7. In response to the falling of a row address strobe (RAS) signal, an upper address is sent to the DRAM for accessing it. On the other hand, in response to the falling of a column address strobe (CAS) signal, a lower address is sent to the DRAM for addressing it.

During the read/write mode of DRAM, the above-described timing is repeated to access the DRAM so that desired data can be written into or read from the DRAM.

In order to access the DRAM from a central processing unit (CPU) by the conventional access method described above, respective signals must be sent out for each access in accordance with the timing specified above. With a high-speed 32-bit CPU, a wait time of several cycles is necessary and this inevitably increases the access time.

The clock rate of recent models of CPU is very high and in order to cope with this situation, a cache memory is often composed using an expensive static RAM. However, a large-capacity memory composed of a static RAM is expensive and, at the same time, the cache memory requires a complicated control circuit.

SUMMARY OF THE INVENTION

The present invention has been accomplished under these circumstances and has as an object providing a memory access method that is capable of configuring a large-capacity, high-speed memory at low cost and in a simple way.

In order to achieve this object, a method of accessing a dynamic random access memory according to the invention, comprises the steps of: latching an upper address of the most recent address signal supplied from a requesting element; sending out the upper address of the most recent address signal and an active row address strobe signal to the dynamic random access memory; sending out a lower address of the most recent address signal and an active column address strobe signal to the dynamic random access memory; comparing the latched upper address with an upper address of a subsequent address signal supplied from the requesting element at the time of the next access request; outputting a coincidence signal when the latched upper address and the upper address of the subsequent address signal correspond; and sending to the dynamic random access memory a lower address of the subsequent address signal and an active column address strobe signal in response to the coincidence signal.

In the memory access method of the present invention, the upper address of a subsequent address signal is compared with the latched upper address and, if the two addresses coincide, the lower address of the subsequent address signal and an active column address strobe signal are sent out to access the dynamic RAM which has earlier been supplied with an active row address strobe signal. In other words, a row address strobe signal need not be sent out if the two upper addresses coincide; thus, contributing to a shorter access time by the CPU.

DETAILED DESCRIPTION OF THE PREFERRED EMBODIMENTS

An embodiment of the memory access method of the present invention will be described below with reference to accompanying FIGS. 1–6.

Figure 1:
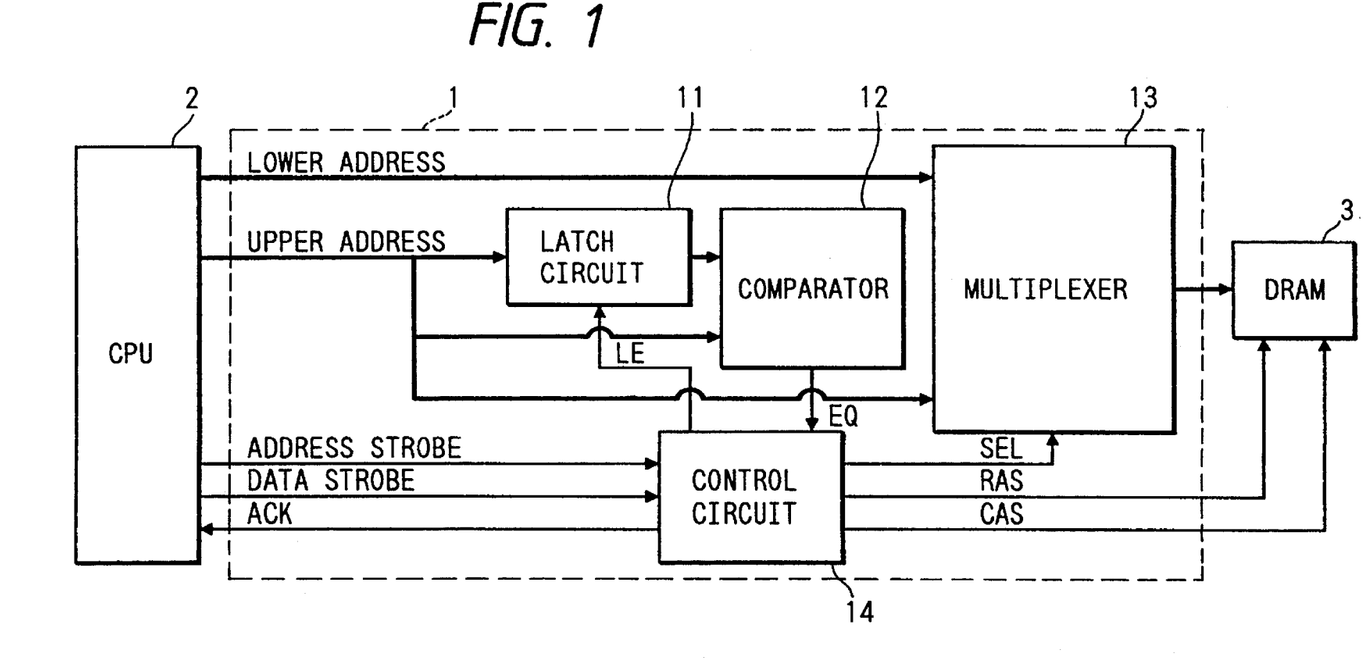
FIG. 1 is a block diagram showing an example of the memory access device in which the memory access method of the present invention is implemented.

FIG. 1 is a block diagram showing an example of the memory access device in which the memory access method of the present invention is implemented. In response to a request for access from a central processing unit (hereinafter sometimes referred to as "CPU") 2, a memory access device 1 accesses a dynamic random-access memory (DRAM) 3 for reading or writing data.

The memory access device 1 has the following components: a latch circuit 11 for latching an upper address sent from the CPU 2; a comparator 12 for comparing the upper address produced from the latch circuit 11 (i.e., the upper address sent at the most recent time of accessing) with the upper address produced from the CPU 2 (i.e., the upper address sent at the subsequent time of accessing; a multiplexer 13 for appropriately selecting the upper or lower address from the CPU 2 in response to an input selection signal and for sending the selected address to the DRAM 3; and a control circuit 14 for controlling the respective components described above.

Figure 2:
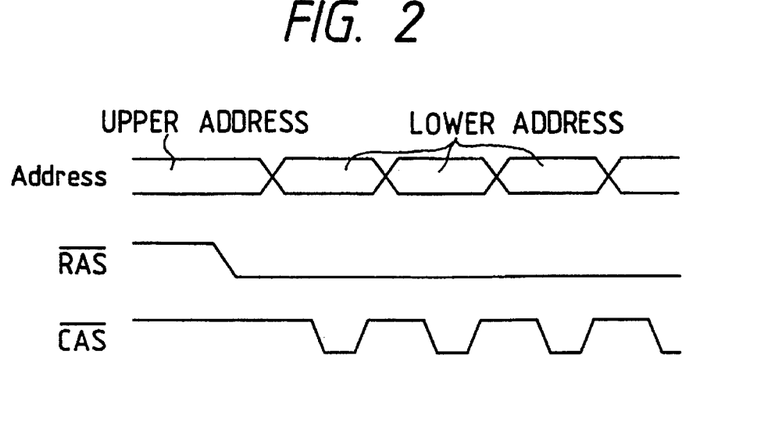
FIG. 2 is a timing chart showing the operation of a dynamic RAM in a page mode.

DRAM 3 has a high-speed page mode. Given a fixed upper address, DRAM 3 in the high-speed page mode can be accessed by sending out a row address strobe (RAS) signal and an upper address, and, subsequently, sending out column address strobe (CAS) signals and lower addresses as shown in FIG. 2.

Figure 3:
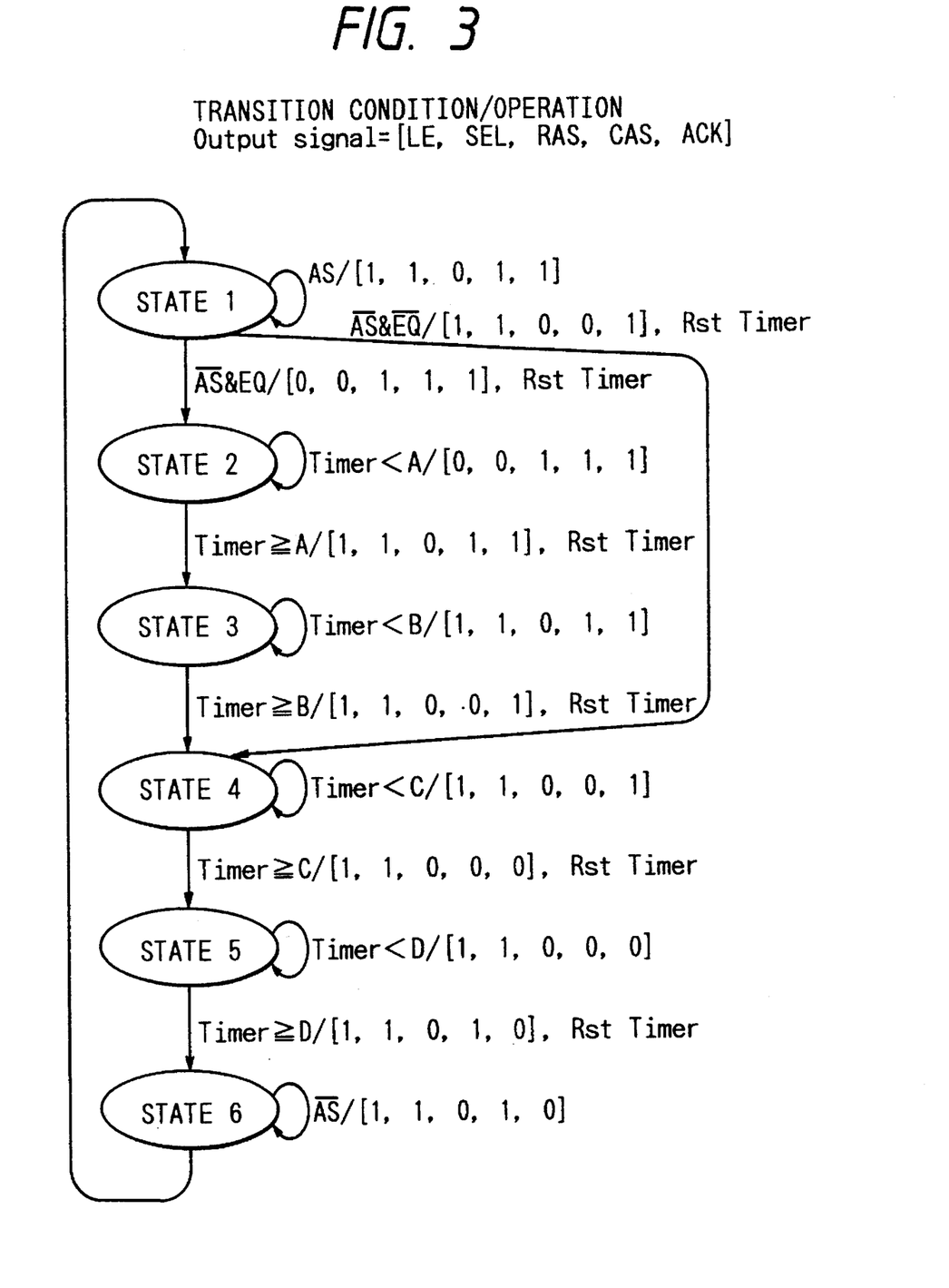
FIG. 3 is a state transition diagram for illustrating the operation of memory accessing in accordance with the present invention.

FIG. 3 is a state transition diagram showing the operation of memory accessing according to the method of the present invention. In FIG. 3, each of states 1–6 and the condition for making a transition from a certain state to another are denoted by a transition condition/operation (=output signal).

In the "transition condition", AS denotes an address strobe signal supplied from CPU 2, and EQ denotes an equal signal supplied from the comparator 12. The equal signal indicates the coincidence between two compared addresses. Symbols AS and EQ without a bar denote a high level whereas AS and EQ with a bar-above denote a low level.

As for the "operation" indicated by an output signal =[LE, SEL, RAS, CAS, ACK), LE denotes a latch enable signal to be supplied into the latch circuit 11, SEL a select signal to be supplied into the multiplexer 13, RAS a row address strobe signal to be supplied into DRAM 3, CAS a column address strobe signal to be supplied into DRAM 3, and ACK a response signal to be supplied into CPU 2. The high level of each output signal is denoted by "1" and its low level by "0".

In FIG. 3 Rst Timer denotes a reset timer and A, B, C and D are constants that are determined by the DRAM.

The procedure of accessing DRAM 3 with the memory access device will be described below with reference to FIGS. 4 and 5, in which "negate" is assumed to be "inactive (high level)" whereas "assert" is assumed to be "active (low level)".

The accessing process starts with reset state where a row address strobe (RAS) signal and a column address strobe (CAS) signal are set in a "negate" condition whereas a select (SEL) signal is set in such a way to select an upper address. When a $\overline{SEL}$ signal is in an "assert" condition, an upper address is selected and if $\overline{SEL}$ signal is in a "negate" condition, a lower address is selected. Either of these addresses is outputted from the multiplexer 13.

In this reset state, the control circuit 14 is supplied with a "negate" address strobe (AS) signal and data strobe (DS) signal from CPU 2 and with a "negate" equal (EQ) signal from the comparator 12. The control circuit 14 supplies the latch circuit 11 with a "negate" latch enable (LE) signal, supplies the multiplexer 13 with a "negate" $\overline{SEL}$ signal, and supplies DRAM 3 with "negate" RAS and CAS signals.

Figure 4:
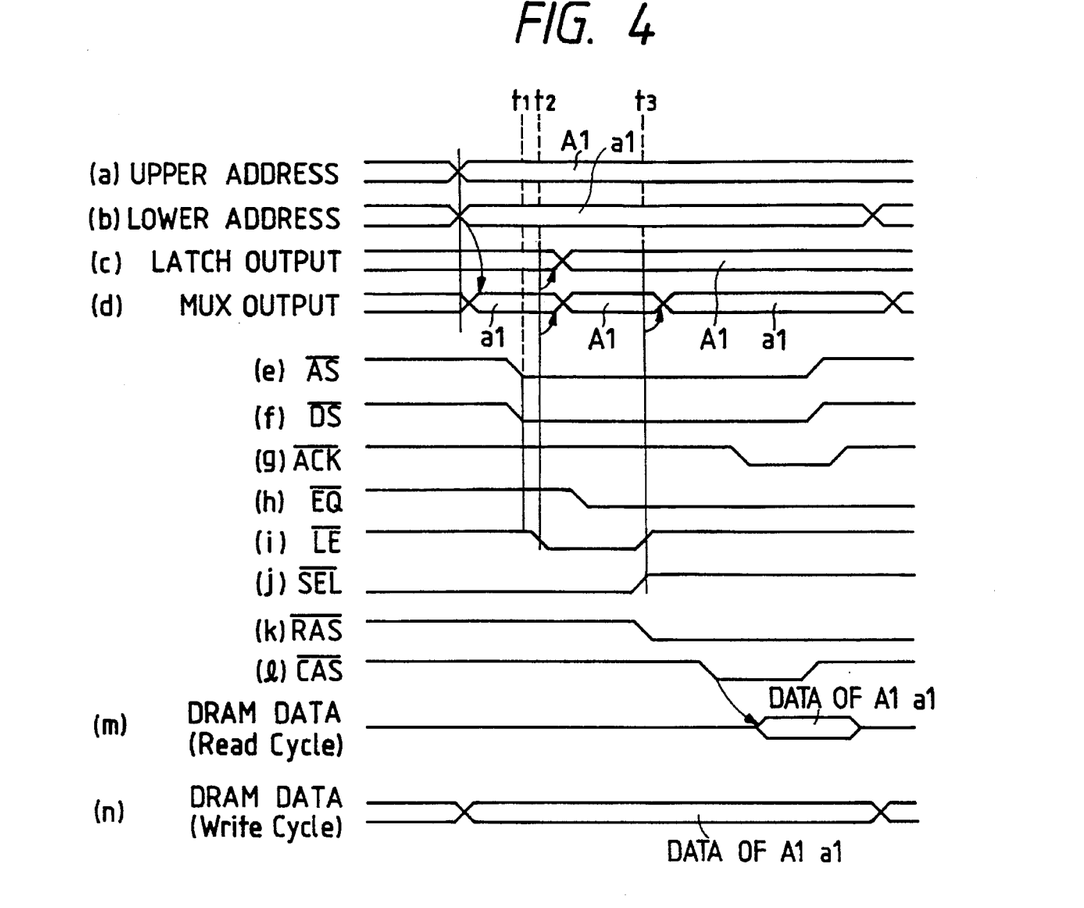
FIGS. 4 and 5 are timing charts showing the procedure of a memory access process.

Suppose here that CPU 2 starts the first accessing of DRAM 3 by sending out an upper address (A1) (FIG. 4a), a Lower address (a1) (FIG. 4b), an $\overline{AS}$ signal (FIG. 4e) and a $\overline{DS}$ signal (FIG. 4f). Then, as shown in FIG. 4i, the control circuit 14 brings the $\overline{LE}$ signal from a "negate" to "assert" state on the basis of the $\overline{AS}$ signal asserted at time $t_1$. At time $t_2$, the latch circuit 11 latches the upper address (A1) on the basis of the asserted $\overline{AS}$ signal and delivers the same to the comparator 12 in accordance with the timing shown in FIG. 4c.

The comparator 12 then compares the upper address (FIG. 4c) from the latch circuit 11 with the upper address from CPU 2 (FIG. 4a). If the two addresses do not coincide, the comparator 12 produces the "negate" EQ signal unaltered. Otherwise, the EQ signal is changed from a "negate" to "assert" state and the comparator 12 produces the resulting $\overline{EQ}$ signal as shown in FIG. 4h.

After the passage of DRAM-prescribed time period from time $t_2$ when the $\overline{LE}$ was asserted, the control circuit 14 asserts the $\overline{RAS}$ signal (FIG. 4k) and negates the $\overline{SEL}$ signal (FIG. 4j). Then, on the basis of the $\overline{SEL}$ negated at time $t_3$, the presently selected and delivered upper address is replaced by a lower address as shown in FIG. 4d and the multiplexer 13 outputs the selected lower address to DRAM 3. When the lower address is sent out to DRAM 3, the control circuit 14 brings the $\overline{CAS}$ signal from a "negate" to "assert" state (FIG. 4l) and brings the $\overline{ACK}$ (response) signal from a "negate" to "assert" state (FIG. 4g).

When the $\overline{DS}$ signal that has been changed from an "assert" to "negate" state (FIG. 4f) is supplied from CPU 2 to the control circuit 14, the latter negates both the $\overline{CAS}$ signal (FIG. 4l) and the $\overline{ACK}$ signal (FIG. 4g) on the basis of the negated $\overline{DS}$ signal. However, the $\overline{RAS}$ signal is maintained in an "assert" state.

As a result of the operation described above, data is read from DRAM 3 in accordance with the timing shown in FIG. 4m and data is written into DRAM 3 in accordance with the timing shown in FIG. 4n.

When CPU 2 ends the first accessing of DRAM 3, the next accessing is performed at an address that is composed of an upper address different from the upper address of the first accessed address. The operation of the memory access device for this second accessing will be described below with reference to the timing chart of FIG. 5.

Figure 5:
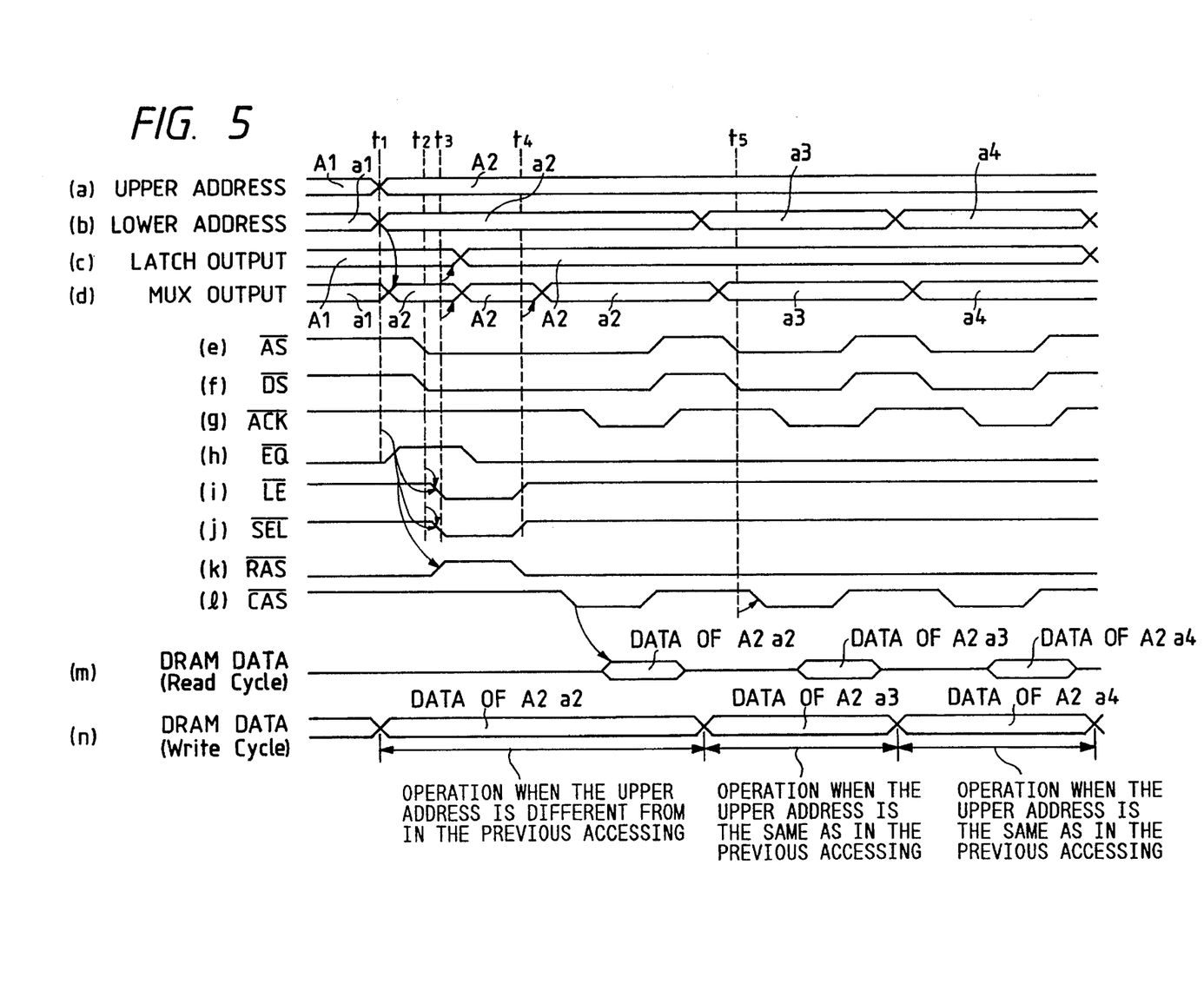

The second accessing starts with CPU 2 outputting an upper address (A2) at time $t_1$ (FIG. 5a). Then, the comparator 12 compares the upper address (A1) from the latch circuit 11 with the upper address (A2) from CPU 2. Since the two upper addresses do not coincide in this case, the $\overline{EQ}$ signal is brought from an "assert" to "negate" state as shown in FIG. 5h and the comparator 12 outputs the negated $\overline{EQ}$ signal to the control circuit 14, which negates the $\overline{RAS}$ signal (FIG. 5k) based on the negated $\overline{EQ}$ signal.

When CPU 2 delivers an $\overline{AS}$ signal (FIG. 5e) and a $\overline{DS}$ signal (FIG. 5f), the control circuit 14 asserts the $\overline{SEL}$ and $\overline{LE}$ signals based on the $\overline{AS}$ signal asserted at time $t_2$. Then, on the basis of the $\overline{SEL}$ signal asserted at time $t_3$ as shown in FIG. 5j, the presently selected and delivered lower address is replaced by an upper address (A2) and the multiplexer 13 outputs the selected upper address to DRAM 3.

As shown in FIG. 5c, the upper address (A2) latched on the basis of the $\overline{LE}$ signal asserted at time $t_3$ (FIG. 5i) is delivered from the latch circuit 11 to the comparator 12, which compares the address (A2) from the latch circuit 11 with the address (A2) from CPU 2. If the two addresses coincide, the comparator 12 brings the $\overline{EQ}$ signal from a "negate" to "assert" state. When the latch circuit 11 latches the upper address, the control circuit 14 assets the $\overline{RAS}$ signal (FIG. 5k) and after the passage of a DRAM-prescribed time period from time $t_2$ when the $\overline{LE}$ signal was asserted, the control circuit 14 negates the $\overline{SEL}$ signal (FIG. 5j) and asserts the $\overline{CAS}$ signal (FIG. 5l).

On the basis of the $\overline{SEL}$ signal negated at time $t_4$, the presently selected upper address is replaced by a lower address (a2) in the multiplexer 13 as shown in FIG. 5d. The lower address (a2) is sent out to DRAM 3 from the multiplexer 13. Then, in order to notify the event of data reading/writing, the control circuit 14 supplies CPU 2 with the $\overline{ACK}$ signal after it is brought from a "negate" to "assert" state as shown in FIG. 5g. At the same time, on the basis of the "negate" $\overline{DS}$ signal supplied from CPU 2 in response to the asserted $\overline{ACK}$ signal, the control circuit 14 brings both the $\overline{CAS}$ and $\overline{ACK}$ signals from an "assert" to "negate" state. However, the $\overline{RAS}$ signal is maintained in an "negate" state.

As described above, if the upper address sent in the previous accessing by CPU does not coincide with the present upper address, the state transition shown in FIG. 3 occurs in sequentially order irom state 1 to state 6.

When a third accessing is performed at an address composed of the same upper address as the address accessed for the second time, the upper address (A2) latched in the latch circuit 11 is equal to the upper address (A2) delivered from CPU 2. Therefore, the comparator 12 outputs the asserted EQ signal.

In this state, the control circuit 14 which is to be supplied with a $\overline{DS}$ signal that has been changed from a "negate" to "assert" state for accessing from CPU 2 asserts the $\overline{CAS}$ signal (FIG. 5l) to be sent out to DRAM 3, as well as the $\overline{ACK}$ signal (FIG. 5g) to be sent out to CPU 2 on the basis of the $\overline{DS}$ signal asserted at time $t_5$ (FIG. 5f). At the same time, the control circuit 14 negates both the $\overline{CAS}$ and $\overline{ACK}$ signals on the basis of a negated $\overline{DS}$ signal supplied from CPU 2 in response to the asserted $\overline{ACK}$ signal. However, the $\overline{RAS}$ signal is maintained in an asserted state.

As a result of the operation described above, data is read from DRAM 3 in accordance with the timing shown in FIG. 5m and data is written into DRAM 3 in accordance with the timing shown in FIG. 5n.

As described above, if the upper address sent in the previous accessing by CPU coincides with the present upper address, the state transition shown in FIG. 3 occurs sequentially in the order of from state 1 to state 6 except for states 2 and 3.

In short, when the upper address sent in the previous accessing by CPU coincides with the present upper address (i.e., in the case where the $\overline{EQ}$ signal is in an "assert" state when DRAM is to be accessed by CPU), data is read or written in accordance with the timing that follows time $t_5$ shown in FIG. 5. On the other hand, if the two upper addresses do not coincide, data is read or written in accordance with the timing that follows time $t_2$ shown in FIG. 5.

In general, for the addresses sent from a CPUf when the CPU sends out a certain address, the CPU subsequently tends to access at a nearby address. For instance, the instruction-fetching event often involves the continuous sending of addresses increasing in 1-word increments and this is also true with data accessing using a stack pointer, which often involves the continuous sending of addresses increasing in 1-word increments or decreasing in 1-word decrements. In these cases, the upper address indicated by $\overline{RAS}$ signal are often the same. Therefore, as described in the embodiment discussed on the foregoing pages, if the upper address sent out upon a first accessing for processing program or data is stored while the $\overline{RAS}$ signal is maintained at a low (active) level, a second accessing can be accomplished by sending out the $\overline{CAS}$ signal and a lower address to DRAM on the condition that the upper address sent during the second accessing coincides with the stored upper address. This contributes to a significant reduction in the access time from CPU.

Further, instruction fetching usually alternates with data accessing. Consider, for example, the case where data is continuously read from a stack. In this case, the instruction fetching event occurs alternately with the reading of data from the stack and the RAS cycle will come in on each occasion if the upper address differs between the instruction area and the data area.

Figure 6:
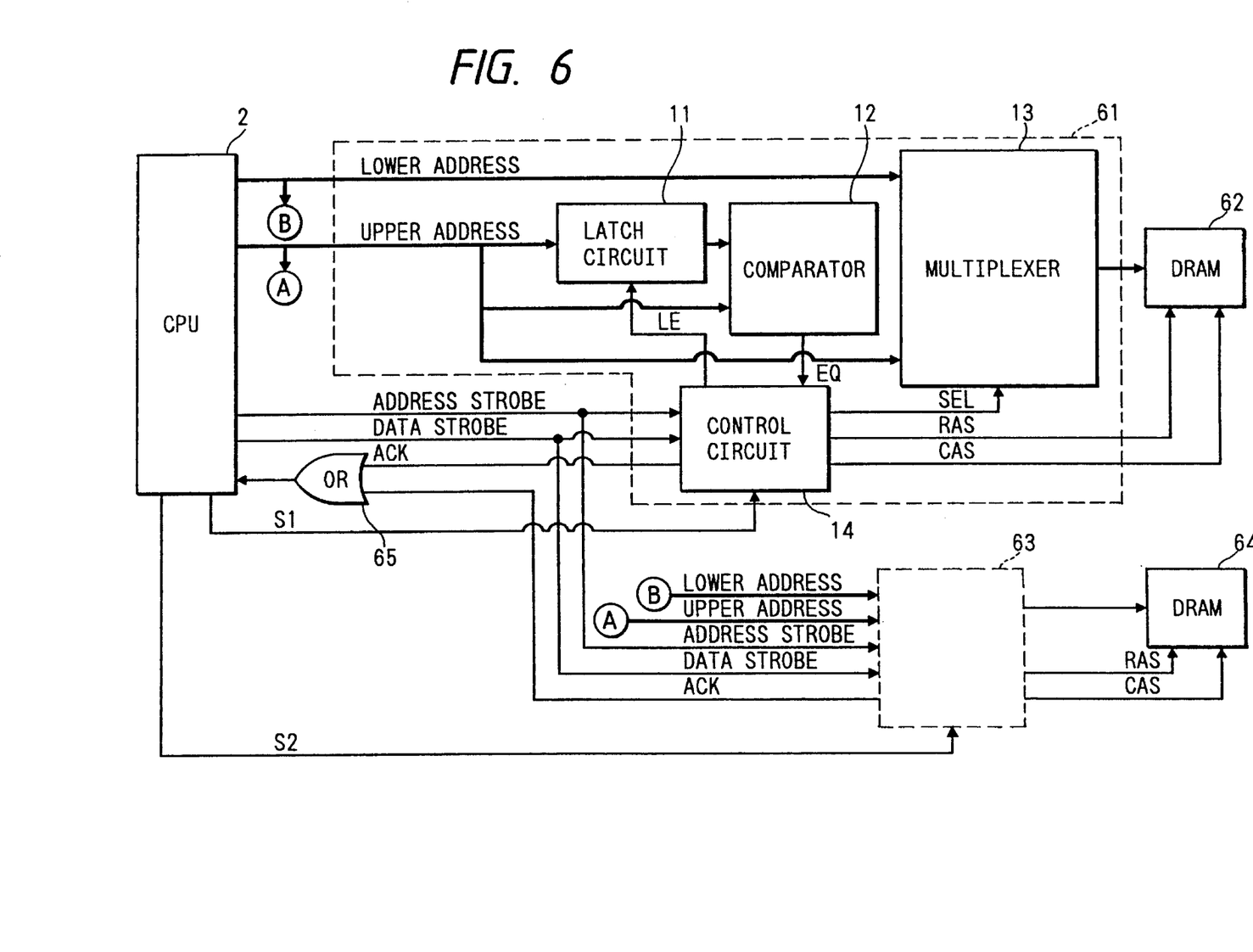
FIG. 6 is a diagram showing the configuration of circuitry incorporating an application of the memory access device shown in FIG. 1.

In order to prevent this problem, the embodiment under consideration may be applied to a system of the type shown in FIG. 6, in which two units of the memory access device described above are provided, one for the program area and the other for the data area, and adapted to operate independently of each other.

The system shown in FIG. 6 includes a memory access device 61 for the program area, a DAM 62 for program storage, a memory access device 63 for the data area, and a DRAM 64 for data storage. Each of the memory access devices 61 and 62 has the same configuration as the memory access device 1 shown in FIG. 1.

For accessing the program area, CPU 2 supplies the control circuit 14 in the memory access device 61 with a signal S1 that brings the control circuit to an active state. For accessing the data area, CPU 2 supplies the control circuit (not shown) in the memory access device 63 with a signal S2 that brings the control circuit to an active state. CPU 2, on the other hand, is supplied with an $\overline{ACK}$ (response) signal from either the memory access device 61 or 63 via an OR circuit 65. When one of the two memory access devices is active, the other memory access device retains its own state.

As described on the foregoing pages, the method of the present invention permits a DRAM to be accessed, as requested, by sending out a lower address and an active CAS signal to the DRAM if the upper address from the request element (CPU) coincides with the latched upper address. This enables the CPU to access the DRAM with a significantly shortened access time.

An obvious advantage of this feature is that an inexpensive and simplified large-capacity, high-speed memory can be provided using a dynamic RAM rather than a static RAM which has heretofore been necessary in the prior art.

What is claimed is:

1. A memory access control circuit coupled to a requesting and to a first and second dynamic random access memories, wherein the requesting element outputs an address strobe signal, a plurality of address signals each having a upper and lower address, and first and second active state signals, wherein the first and second dynamic access memories receive the upper and lower addresses and the first dynamic access memory for program storage and the second dynamic access memory for data storage, the memory access control circuit comprising:

a first latching circuit, for latching an outputted upper address of a most recent address signal when a most recent access request occurs, coupled to the requesting element;

a first comparator, for comparing the latched upper address with an outputted upper address of a subsequent address signal when a subsequent access request occurs and for outputting a first coincidence signal when the compared upper addresses are identical, being coupled to the requesting element and the first latching circuit;

a first multiplexer, for receiving the outputted upper and lower addresses and for selectively outputting the upper and lower addresses, coupled to the requesting element and the first dynamic random access memory;

first control means, operational in response to the first active state signal and the address strobe signal or first coincidence signal and for controlling the first dynamic random access memory to receive the lower address if the first comparator outputs the first coincidence signal and to receive the upper and lower addresses if the first comparator does not output the first coincidence signal, coupled to the requesting element, first comparator, first multiplexer, and first dynamic random access memory;

a second latching circuit, for latching an outputted upper address of a most recent address signal when a most recent access request occurs, coupled to the requesting element;

a second comparator, for comparing the latched upper address with an outputted upper address of a subsequent address signal when a subsequent access request occurs and for outputting a second coincidence signal when the compared upper addresses are identical, being coupled to the requesting element and the second latching circuit;

a second multiplexer, for receiving the outputted upper and lower addresses and for selectively outputting the upper and lower addresses, coupled to the requesting element and the second dynamic random access memory; and second control means, operational in response to the second active state signal and the address strobe signal or second coincidence signal and for controlling the second dynamic random access memory to receive the lower address if the second comparator outputs the second coincidence signal and to receive the upper and lower addresses if the second comparator does not output the second coincidence signal, coupled to the requesting element, second comparator, second multiplexer and second dynamic random access memory.

2. The memory access control circuit of claim 1 wherein said requesting element is a central processing unit.

* * * * *

UNITED STATES PATENT AND TRADEMARK OFFICE
CERTIFICATE OF CORRECTION

PATENT NO. : 5,524,228
DATED : June 04, 1996
INVENTOR(S) : Naotaka MARUYAMA et al.

It is certified that error appears in the above-indentified patent and that said Letters Patent is hereby corrected as shown below:

Claim 1, Column 6, line 16, before "and" (first occurrence) insert --element--.

Claim 1, Column 6, line 18, "a" (second occurence) should read --an--.

Signed and Sealed this

Seventh Day of January, 1997

Attest:

BRUCE LEHMAN

Attesting Officer

Commissioner of Patents and Trademarks